(12) United States Patent
Xiong et al.

(10) Patent No.: US 8,331,627 B2
(45) Date of Patent: Dec. 11, 2012

(54) METHOD AND SYSTEM FOR GENERATING AN ENTIRELY WELL-FOCUSED IMAGE OF A LARGE THREE-DIMENSIONAL SCENE

(75) Inventors: Wei Xiong, Singapore (SG); Qi Tian, Singapore (SG); Joo Hwee Lim, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 364 days.

(21) Appl. No.: 12/680,478

(22) PCT Filed: Sep. 26, 2008

(86) PCT No.: PCT/SG2008/000366
§ 371 (c)(1),
(2), (4) Date: Jun. 18, 2010

(87) PCT Pub. No.: WO2009/041918
PCT Pub. Date: Apr. 2, 2009

(65) Prior Publication Data
US 2010/0254596 A1    Oct. 7, 2010

Related U.S. Application Data

(60) Provisional application No. 60/975,392, filed on Sep. 26, 2007.

(51) Int. Cl.
*G06K 9/00* (2006.01)
*G06K 9/62* (2006.01)

(52) U.S. Cl. .................................. 382/109; 382/159

(58) Field of Classification Search .................. 382/109, 382/159, 276, 154, 128–134, 284; 359/368, 359/382–383, 391; 356/12, 307; 345/629; 348/E5.045, 224.1, 229.1, 350, 349, 354, 348/364

See application file for complete search history.

(56) References Cited

U.S. PATENT DOCUMENTS

| | | | |
|---|---|---|---|
| 4,965,840 A * | 10/1990 | Subbarao | 382/106 |
| 5,093,716 A | 3/1992 | Kondo et al. | |
| 5,850,352 A * | 12/1998 | Moezzi et al. | 345/419 |
| 6,522,774 B1 | 2/2003 | Bacus et al. | |

(Continued)

OTHER PUBLICATIONS

Price, Jeffrey H, "High Throughput Microscopy: From Images to Data," 3rd IEEE International Symposium on Biomedical Imaging Macro to Nano, ISBI 2006, pp. 247-250.

(Continued)

*Primary Examiner* — Matthew Bella
*Assistant Examiner* — Mehdi Rashidian
(74) *Attorney, Agent, or Firm* — Christie, Parker & Hale, LLP.

(57) ABSTRACT

A method and system for generating an entirely well-focused image of a three-dimensional scene. The method comprises the steps of a) learning a prediction model including at least a focal depth probability density function (PDF), h(k), for all depth values k, from historical tiles of the scene; b) predicting the possible focal surfaces in subsequent tiles of the scene by applying the prediction model; c) for each value of k, examining h(k) such that if h(k) is below a first threshold, no image is acquired at the depth k' for said one tile; and if h(k) is above or equal to a first threshold, one or more images are acquired in a depth range around said value of k for said one tile; and d) processing the acquired images to generate a pixel focus map for said one tile.

11 Claims, 8 Drawing Sheets

U.S. PATENT DOCUMENTS

| | | | |
|---|---|---|---|
| 6,711,283 | B1 | 3/2004 | Soenksen |
| 6,847,402 | B2 | 1/2005 | Sugimoto et al. |
| 7,016,110 | B2 | 3/2006 | Leblans |
| 8,184,157 | B2* | 5/2012 | Mittal .................. 348/143 |
| 2005/0190964 | A1* | 9/2005 | Toyama ............... 382/159 |
| 2007/0019883 | A1* | 1/2007 | Wong et al. .......... 382/276 |
| 2009/0318815 | A1* | 12/2009 | Barnes et al. ........ 600/473 |
| 2010/0111370 | A1* | 5/2010 | Black et al. .......... 382/111 |

OTHER PUBLICATIONS

Smith, Janet L., "Picture Perfect," Modern Drug Discovery, Jan. 2004, pp. 45-46.

Comley, John, "High Content Screening," Drug Discovery World, Summer 2005, pp. 31-53.

Spring, et al., "Basic Concepts and Formulas in Microscopy", Nikon Microcopy U, http://www.microscopyu.com/articles/formulas/formulasfielddepth.html, 3pp.

Subbarao et al., "Focusing Techniques," Optical Engineering, vol. 32, No. 11, Nov. 1993, pp. 2824-2836.

Subbarao et al., "Selecting the Optimal Focus Measure for Autofocusing and Depth-from-Focus," IEEE Transactions on Pattern Analysis and Machine Intelligence, vol. 20, No. 8, Aug. 1998, pp. 864-870.

Groen et al., "A Comparison of Different Focus Functions for Use in Autofocus Algorithms," Cytometry, vol. 6, pp. 81-91, 1985.

Firestone et al., "Comparison of Autofocus Methods for Automated Microscopy," Cytometry, vol. 12, pp. 195-206, 1991.

Yeo et al., "Autofocusing for Tissue Microscopy," Image and Vision Computing, vol. 11, No. 10, Dec. 1993, pp. 629-636.

Kaneko et al., "Dynamic Focusing Lens for Expanding Depth of Focus of Optical Microscope," IEEE Seventh International Symposium on Micro Machine and Human Science, 1996, pp. 157-162.

Fedorov et al., "Multi-Focus Imaging Using Local Estimation and Mosaicking," IEEE International Conference on Image Processing 2006 (ICIP06), Atlanta, GA USA, Oct. 2006; 4pp.

Ravkin et al., "Automated Microscopy System for Detection and Genetic Characterization of Fetal Nucleated Red Blood Cells on Slides," Proceedings of SPIE, vol. 3260, pp. 180-191, 1998.

Hilsenstein, Volker, "Robust Autofocusing for Automated Microscopy Imaging of Fluorescently Labelled Bacteria," Proceedings of the Digital Imaging Computing: Techniques and Applications (DICTA 2005), 7 pp.

Pentland, Alex P., "A New Sense for Depth of Field," IEEE Transactions on Pattern Analysis and Machine Intelligence, vol. PAMI-9, No. 4, 1987, pp. 523-531.

Grossmann, P., "Depth from Focus," Pattern Recognition Letters, vol. 5, pp. 63-69, Jan. 1987.

Nayar et al., "Shape from Focus," IEEE Transactions on Pattern Analysis and Machine Intelligence, vol. 16, No. 8, 1994, pp. 824-831.

Fuijfilm USA, Digital Camera FinePix S8000fd—Specifications, http://www.fujifilmusa.com/products/digital_cameras/s/finepix_s8000fd/specification. ., Nov. 10, 2008, 4pp.

CNET Asia; Fujifilm FinePix S6000fd Digital camera reviews—CNET Reviews, http://reviews.cnet.com/digital-cameras/fujifilm-finepix-s6000fd/4505-6501_7-31974 . . . , Nov. 10, 2008, 9pp.

Best Camcorder Reviews: Sep. 2008, http://best-camcorder-reviews.blogspot.com/2008_09_01_archive.html, Nov. 10, 2008, 23pp.

Young et al., "Depth-of-Focus in Microscopy", SCIA'93, Proc. of the 8th Scandinavian Conference on Image Analysis, Tromso, Norway, 1993, pp. 493-498.

Prior Scientific, Inc. ProScan II Operation Instruction manual for ProScan II motorized stage system, http://www.prior.com/, accessed on Feb. 9, 2007, 222 pp.

Hart, J. E., "3D Microscopy and High-Magnification Macro-Photography: Digital Reconstruction and Depth-of-Field Expansion," http://cumulus.colorado.edu/Imagestacks.shtm, 13pp.

Rojo et al., "Critical Comparison of 31 Commercially Available Digital Slide Systems in Pathology," International Journal of Surgical Pathology, vol. 14, No. 4, pp. 285-305, 2006.

Kodama et al., "Iterative Reconstruction of an All-Focused Image by Using Multiple Differently Focused Images," 1996 IEEE International conference on Image Processing, vol. 3, pp. 551-554, 1996.

Ferreira et al., The Virtual Microscope, Proc. AMIA Annu. Fall Symp. 1997, 5 pp.

Xiong et al., "An Adaptive Enhanced Focusing Technique for Whole Slide Imaging Using Contextual Information", The 3rd IEEE Conference on Industrial Electronics and Applications, Jun. 2008, Singapore, Proceedings of ICIEA, pp. 1837-1840.

Xiong et al., "Automatic Working Area Classification in Peripheral Blood Smears without Cell Central Zone Extraction," 30th Annual International IEEE Conference Engineering in Medicine and Biology Society, Aug. 2008, pp. 4074-4077.

Xiong et al., "Automatic Working Area Classification in Peripheral Blood Smears Using Spatial Distribution Features Across Scales," 19th International conference on pattern recognition, ICPR 2008, Tampa, Florida, USA, Dec. 8-11, 2008, 4pp.

Ho et al., "Use of whole slide imaging in surgical pathology quality assurance: design and pilot validation studies," Human Pathology, vol. 37, No. 3, pp. 322-331, 2006.

* cited by examiner

- Evaluation Point ▨ Evaluation Square ▨ Interpolation Square

METHOD AND SYSTEM FOR GENERATING AN ENTIRELY WELL-FOCUSED IMAGE OF A LARGE THREE-DIMENSIONAL SCENE

CROSS-REFERENCE TO RELATED APPLICATION

This application is a National Phase Patent Application and claims the priority of International Application Number PCT/SG2008/000366, filed on Sep. 26, 2008, which claims priority of U.S. Provisional Patent Application No. 60/975,392, filed on Sep. 26, 2007.

FIELD OF INVENTION

The present invention relates broadly to a method and system for generating an entirely well-focused image of a three-dimensional scene and to a computer readable data medium having stored thereon a computer code means for instructing a computer to execute a method of generating an entirely well-focused image of a three-dimensional scene.

BACKGROUND

Generating entirely well-focused images in automatic imaging large three-dimensional scene is to automatically acquire images from the large scene and produce an all-focused high-resolution image of the whole scene using many snapshots of portions of the scene. For example, in unattended automatic optical imaging of a large three-dimensional scene, a series of consecutive sections of the scene is to be imaged and automatic focusing is needed to generate entirely well-focused images. There are two typical scenarios:

1) In light microscopy: automatic imaging of the whole or a large portion of specimen slides using light microscopes, i.e., the so-called high throughput scanning (HTS), or whole-slide imaging;

2) In classical photography: unattended continuous scene capturing and tracking using normal (still/video) cameras, such as in video surveillance, close-up photography and vision-guided robotics, where focus is adjusted automatically, repeatedly and dynamically.

In optical imaging, two important concepts are field of view (FOV) and depth of field (DOE). Consider the imaging system is described in an X-Y-Z three-dimensional coordinates with the Z being the optical axis and the imaging plane being the X-Y plane. FOV is the two-dimensional area in the X-Y plane that an imaging system can see in a single shot. DOF is the range of distances that the imaging system can maintain focus at certain depth along the optical axis.

Figure 1:
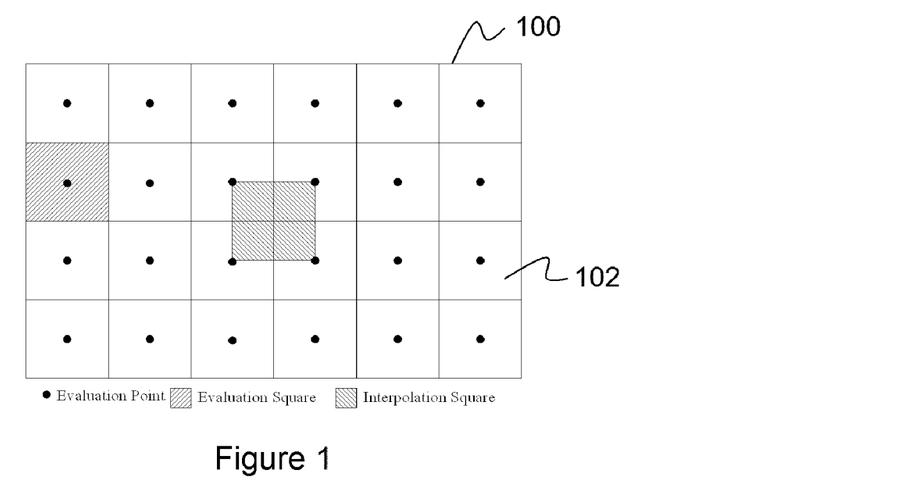
FIG. 1 is a schematic drawing illustrating conceptionally an image plane partition into non-overlapped grids.

A singly well-focused image only contains a single focus. A focused image may have multiple focuses. In comparison, an entirely well-focused image (also called all-focused image (AFI)) is an image whose every portion is well-focused. Therefore, the optimal focus of each portion, possibly with different degrees, has to be found. Finding the optimal focus requires the evaluation of the degree of focus using a stack of images, called Z-stack images since they are acquired at different positions along the Z-axis. These positions are called nodes herein and they are determined by using some sampling rates along this axis. Such techniques are also referred to as extended focal imaging (EFI) or focus enhancement. The computation cost increases dramatically if the number of portions is high. In typical cases, such a number is in the order of a few hundreds or even thousands. FIG. 1 illustrates conceptually that an image plane 100 is partitioned into 6×4 non-overlapped grids e.g. 102 of the same size $N_g \times N_g$. Each grid 102 is a portion on which the focus value is evaluated, called an evaluation square, and the center of the square called the evaluation point (EP).

Where the scene is large, it is impossible to capture the entire scene in a single snapshot due to relatively limited field of view of the optical imaging system. Hundreds even thousands of snapshots are needed, each on a small region of the large scene, called a tile or a section. These tiles may be overlapped or non-overlapped.

Marcial et al [Marcial Garcia Rojo, Gloria Bueno Garcia, Carlos Peces Mateos, Jesus Gonzalea Garcia and Manuel Carbajo Vicente, "Critical Comparison of 31 Commerically available Digital Slide Systems in Pathology," International Journal of Surgical Pathology, Vol. 14, No. 4, pp. 285-305, 2006] presented a review of the existing work in this field. They compared critically 31 commercially available related systems that are able to perform a whole slide digitization or assistance in complete slide review The autofocusing involved for obtaining entirely well-focused images is a technique which finds automatically the best focused depth among a curve of focus values FV(k), computed from such a Z-stack of images $\beta_k$, k=1, ..., K, at different depths indexed by k.

Online direct search methods, such as the hill-climbing search, the Fibonacci search or the golden ratio search, are widely used [Dmitry Fedorov, Baris Sumengen, and B. S. Manjunath, "Multi-focus Imaging Using Local Estimation and Mosaicking," IEEE International Conference on Image Processing 2006 (ICIP06), Atlanta, Ga. USA, October 2006] to numerically solve this nonlinear optimization problem. They are online search methods as they decide the search direction just after the comparison of FVs and the positions where the image to be acquired are decided online.

Both the Fibonacci search method and the golden ratio search method belong to the so-called bracketing search methods. They first evaluate two focus values at the two ends of an interval $\Gamma_p$ and then only one focus value is evaluated for each subsequent iteration in a new interval $\Gamma_n$, a portion of $\Gamma_p$. The ratio r between the length of $\Gamma_n$ and that of $\Gamma_p$ is fixed. The termination criteria of all three methods, i.e. hill-climbing search, the Fibonacci search and the golden ratio search, are the same.

All these methods are based on a unimodal assumption that the actual focus values of the windowed image have a shape that peaks at exactly one point and monotonically decreases away from this point. Should the values exhibit such a property, they are rather efficient and can converge to the true peak eventually, likely very fast. However, FV depends on both the image content and the imaging system. The content may be from a scene with multiple layered components. Also, there could be noise in FVs. Therefore, an actual FV curve may not be smooth and may have multiple peaks. As a result, these methods may be trapped into a local optimum, which depends on the initial conditions for the searching starting point. Although there are some variations of the approaches, they basically find local optimum.

Exhaustive search is a method to find the global optimum. Given a grid, suppose the largest possible search range $\Gamma=[k_{min}, k_{max}]$ is known. It is then partitioned into intervals separated by designed nodes. Typically, the equally-spaced nodes at position $k_1, \ldots, k_{N_\Gamma}$, are used such that the interval is $\Delta\Gamma=\text{length}(\Gamma)/(N_\Gamma-1)$. Each node corresponds to a certain optical depth and $N_\Gamma$ images are captured at these $N_\Gamma$ nodes for this grid. The optimal focus depth is the one having the maximal FV among these images. This method will not be trapped into local maximums and is more robust to noise.

The drawback of this method is that the designing of the nodes may be inappropriate. Theoretically, one should follow the Shannon's theorem so that the sampling interval $\Delta\Gamma$ is smaller than a minimum value. To know such a value, one should know the cut-off frequency of the three-dimensional specimen along the optical axis and know the influence of the optical system point spread function (PSF). However, it is hard to know them before we have any examination over the scene (such as a specimen). As a result, either over sampling or under sampling happens in practice.

To avoid loss of information, the highest sampling rate will be used. Given a search range $\Gamma=[k_{min}, k_{max}]$, the number of nodes $N_\Gamma$ is thus the largest. Since one has to evaluate FV at all nodes, the computation cost is proportional to $N_\Gamma$. It is large and the whole search process is slow, compared with the hill-climbing search and the Fibonacci/the golden-ratio search. The amount of memory required to store the images is also large. In practice, one may only store the current maximum FV and its depth index and drop those images captured. However, as a result, one has to capture the images again in case they need to be retrieved later. Another issue is to make sure the actual focuses range is within $\Gamma=[k_{min}, k_{max}]$. To assure this, the largest depth range along the Z-axis is chosen.

The exhaustive method can find the global optimum among the examined images. However it is time-consuming. One way to address this issue is to enlarge the sampling interval $\Delta\Gamma$. However, to avoid down-sampling, prior knowledge is required about the spectrum of the scene along the optical axis before image acquisition and focus search.

It has also been proposed to use an estimation of focus surface for neighboring tiles. Reference [Ilya Ravkin and Vladimir Temov, "Automated microscopy system for detection and genetic characterization of fetal nucleated red blood cells on slides," Proceedings of SPIE, Vol. 3260, pp. 180-191, 1998] introduces a microscopy imaging system developed by Applied Imaging for the detection and genetic characterization of fetal nucleated red blood cells on slides. Z-stack images are acquired to evaluate the FV over a subsampled image or limited to the region of interest within the whole image hence to find a single focus for each image (tile). A second order polynomial function is further developed to predict the focus surface for the new stage position hence new tile dynamically to reduce the error due to the tilt of moving stage, wedging of the slide and cushioning of the cover slip due to mounting media in their application in reference [Volker Hilsenstein, "Robust Autofocusing for Automated Microscopy imaging of Fluorescently Labelled Bacteria," Proceedings of the Digital Imaging Computing: Techniques and Applications (DICTA 2005), pp. 1-7], Volker Hilsenstein also notices the possible tilt of stage and proposes to fit a plane model for the slide to estimate the tilt and the variability of the focus positions, which constrains the search range to the locally optimal range for each field. Although both prior arts have not discussed how to generate an entirely well-focused image, their techniques are in any event limited to predicting focus surfaces by considering structure factors in the imaging system. In other words, those techniques have not considered the influence of factors coming from the scene to be imaged itself, hence offer little advantage where structural factors may not be the only or major influence, for example where the three-dimensional nature of a large scene with varying depth distribution across the scene contributes significantly to varying depths of focus across the scene, or in a calibrated imaging system where the imaging geometry has been corrected.

Even in a single AFI in EFI, there are many evaluation tiles at each of which a local focus needs to be found. Within a single AFI, reference [T. T. E. Yeo, S. H. Ong, Jayasooriah and R. Sinniah, "Autofocusing for tissue microscopy," Image and Vision Computing, Vol. 11, No. 10, December 1993, pp. 629-92910] reviews the basic techniques to find them on each EP, such as Fibonacci search and the exhaust search. For non-EPs, bi-linear interpolation is suggested to decide their local focus surfaces. A recent reference [Dmitry Fedorov, Baris Sumengen, and B. S. Manjunath, "Multi-focus Imaging Using Local Estimation and Mosaicking," IEEE International Conference on Image Processing 2006 (ICIP06), Atlanta, Ga. USA, October 2006] discusses multi-focus imaging, a simplified version of EFI and utilizes local estimation but without involving focus surface predication for neighboring grids/tiles. Both above works discuss forming a single AFI, but do not touch on imaging a large scene.

Sharing the same optical imaging principle, techniques for producing entirely well-focused images in microscopy are also applicable to photography, notably, the methods for the calculation of focus values and finding optimal depths. More generally, autofocusing is much related to the technique of "shape from focus" as well as that of "depth from focus/defocus."

A need therefore exists to provide a method and system for generating an entirely well-focused image of a large three-dimensional scene which seek to address at least one of the above mentioned problems.

SUMMARY

In accordance with a first aspect of the present invention there is provided a method of generating an entirely well-focused image of a three-dimensional scene, the method comprising the steps of a) learning a prediction model including at least a focal depth probability density function (PDF), h(k), for all depth values k, from one or more historical tiles of the scene; b) predicting the possible focal surfaces in a subsequent tile of the scene by applying the prediction model; c) for each value of k, examining h(k) such that if h(k) is below a first threshold, no image is acquired at the depth k' for said one tile; and if h(k) is above or equal to a first threshold, one or more images are acquired in a depth range around said value of k for said one tile; and d) processing the acquired images to generate a pixel focus map for said subsequent tile.

Step c) may comprise examining h(k) such that if h(k) is below the first threshold, no image is acquired at the depth k' for said one tile; and if h(k) is above or equal to the first threshold and below a second threshold, one or more images are acquired in the depth range around said value of k for said one tile using a first sampling rate; and if h(k) is above or equal to the second threshold, one or more images are acquired in the depth range around said value of k for said one tile using a second sampling rate higher than the first sampling rate.

The method may further comprise updating the prediction model before steps a) to d) are applied to a next neighboring tile.

The method may comprise the steps of i) for a first tile, acquiring images at equally spaced values of k and processing the acquired images to find a pixel focus map for said first tile; ii) building the PDF based on said pixel focus map for said first tile; iii) applying steps a) to d) for n consecutive neighboring tiles; and for a (n+1)th tile, return to step i) treating the (n+1)th tile as the first tile.

The PDF may be a pre-learned model and/or a user defined model.

The prediction model may comprise a structure component and a probabilistic component.

The acquiring of images may comprise capturing images or reading stored images.

The method may be applied to microscopy or photography.

The learning of the prediction model may comprise using spatial contextual information.

In accordance with a second aspect of the present invention there is provided a system for generating an entirely well-focused image of a three-dimensional scene, the system comprising a learning unit for learning a prediction model including at least a focal depth probability density function (PDF), h(k), for all depth values k, from one or more historical tiles of the scene; a prediction unit for predicting the possible focal surfaces in a subsequent tile of the scene by applying the prediction model; a processing unit for, for each value of k, examining h(k) such that if h(k) is below a first threshold, no image is acquired at the depth k' for said one tile; and if h(k) is above or equal to a first threshold, one or more images are acquired in a depth range around said value of k for said one tile; and d) processing the acquired images to generate a pixel focus map for said subsequent tile.

In accordance with a third aspect of the present invention there is provided a computer readable data medium having stored thereon a computer code means for instructing a computer to execute a method of generating an entirely well-focused image of a three-dimensional scene, the method comprising the steps of a) learning a prediction model including at least a focal depth probability density function (PDF), h(k), for all depth values k, from one or more historical tiles of the scene; b) predicting the possible focal surfaces in a subsequent tile of the scene by applying the prediction model; c) for each value of k, examining h(k) such that if h(k) is below a first threshold, no image is acquired at the depth k' for said one tile; and if h(k) is above or equal to a first threshold, one or more images are acquired in a depth range around said value of k for said one tile; and d) processing the acquired images to generate a pixel focus map for said subsequent tile.

BRIEF DESCRIPTION OF THE DRAWINGS

Embodiments of the invention will be better understood and readily apparent to one of ordinary skill in the art from the following written description, by way of example only, and in conjunction with the drawings, in which:

FIGS. 7 (a) and (b) show normalised histograms where panel (a) is computed based on the focus depth map based on evaluation points, EP-FDM, and panel (b) is from the focus depth map based on all pixels, Px-FDM shows, according to an example embodiment.

DETAILED DESCRIPTION

The example embodiments described employ a strategy and consider these snapshots as information-connected content in a large context. The present work learns statistical models from historical tiles and utilizes them to predict possible depths in-focus in the current tile position of the three-dimensional scene for image acquisition and automatic focus adjusting. Such an EFI technique produces very encouraging results. We can reduce more than over ⅓ time while maintaining good image quality.

The example embodiments can be applied for example in microscopy applications, virtual microscopy, digital slide systems, digital microscopy, whole-slide scanning (WSI), slide scanners and diagnosis-aided systems using microscopy Generating entirely well-focused images in automatic imaging large three-dimensional scene in the example embodiments is to automatically acquire images from the large scene and produce an all-focused high-resolution image of the whole scene using many snapshots of portions of the scene. There are two typical application scenarios. One is in light microscopy; the other is in classical photography. In the former one, so-called whole-slide imaging or high through-put scanning automatically image the whole or a large portion of the slide specimen uses light microscopes under high magnifications. In the later one, a large continuous scene is captured and tracked, where focus is adjusted automatically, repeatedly and dynamically for the whole scene.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Figure 2:
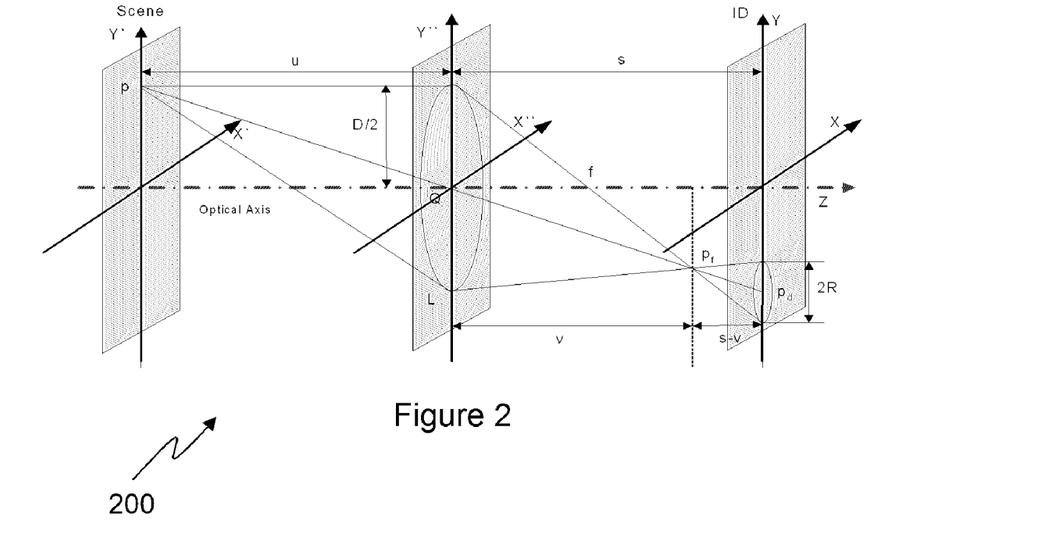
FIG. 2 shows a schematic drawing illustrating an image formation model in a simplified microscope with one camera lens.

FIG. 2 shows an image formation model 200 in a simplified microscope with only one camera lens L with a focal length f. In the thin-lens model, the two principal planes of the optical system coincide. Let p be an object point on a visible surface in the scene, $p_f$ be its focused image and $p_d$ be its detected image by the image detector ID, such as a CCD. The object distance is u and the image distance is v. The aperture diameter D, focal length f and the distance between the principal plane and the detection plane s are referred to camera parameters c≡(s, f, D). Denote the optical axis by Z, the scene surface plane by the X'-axis and the Y'-axis and the detection plane by the X axis and the Y-axis.

We assume the optical system is circularly symmetric around the optical axis and use a paraxial geometric optics model for image formation. According to geometric optics, we have the following relation:

$$\frac{1}{f} = \frac{1}{u} + \frac{1}{v} \tag{1}$$

If the object point p is not in focus or the detection plane and the image plane do not coincide, the detected image is a blurred circle $p_d$ with the same shape of the lens aperture irrespective of the position of p on the object plane. Let R be the radius of the blur circle. From FIG. 2, we have $$\frac{2R}{D} = \frac{s-v}{v}. \tag{2}$$

Therefore, $$R = s\frac{D}{2}\left(\frac{1}{f} - \frac{1}{u} - \frac{1}{s}\right). \tag{3}$$

Note that R can be either positive (if s≧v) or negative (if s<v) [Muralidhara Subbarao, Tae Choi, and Arman Nikzad, "Focusing Techniques," Optical Engineering, Vol. 32, No. 11, pp. 2824-2836, November 1993]. Given D, f, s and starting from the focused position u, moving the object p closer to or away from the lens will increase |R|.

Assume that the light energy incident on the lens from the point p during one exposure period of the camera is uniformly distributed in the blur circle. Thus the circle has a uniform brightness response inside the circle and zeros outside. Hence the point spread function (PSF) of the system is $$\alpha_c(x, y, R) = \begin{cases} \frac{1}{\pi R^2}, & \text{if } x^2 + y^2 \leq R^2 \\ 0, & \text{otherwise} \end{cases} \tag{4}$$

The brightness of the blur circle decreases quadratically as |R| increases. In practice, the image of a point object is not exactly a circle of constant brightness. A two-dimensional Gaussian PSF with a spread σ=R/√2 is often suggested [Muralidhara Subbarao, Tae Choi, and Arman Nikzad, "Focusing Techniques," Optical Engineering, Vol. 32, No. 11, pp. 2824-2836, November 1993]

$$\alpha_G(x, y; \sigma) = \frac{1}{2\pi\sigma^2} \exp\left(-\frac{x^2 + y^2}{2\sigma^2}\right). \tag{5}$$

Figure 3:
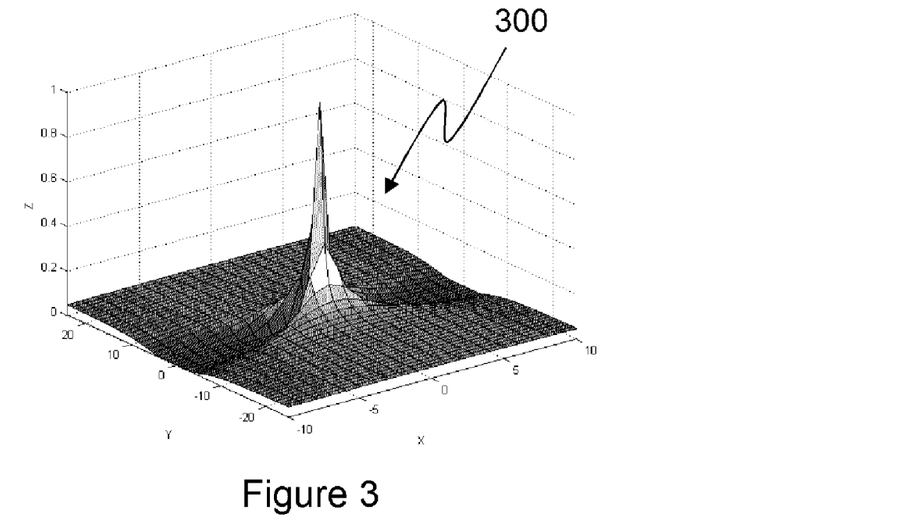
FIG. 3 shows a graph of point spread functions (PSFs) in a camera system.

Collectively, we denote all the PSFs in a camera system as α(x, y; R(c, u)). The PSF 300 of Gaussian is illustrated in FIG. 3 given D, f and s with varying u. Here, Z-axis refers to the function value. Since the PSF in the X-Y plane is rotationally symmetric, we illustrate only the response with respect to the distance (by the X-axis) away from the blur circle center. Note, the Y-axis refers to the shifted variable u such that the origin (0,0) in the (X,Y)-plane corresponds to the in-focus status. Such a response will be very sharp in Y-dimension for high magnification camera systems.

Depth of field is the optical axial resolving power of an objective lens. It is defined in object space. Another related concept, depth of focus, is defined in image space. DOF is determined by the distance from the nearest object plane in focus with tolerable distortion to that of the farthest object plane also simultaneously in focus with tolerable distortion. A widely used criterion for characterizing the distortion due to defocusing is the Rayleigh limit which in this context states that, if we wish to maintain a diffraction limited system, the maximal path difference may never exceed a quarter wave length [http://www.canon.com/camera-museum/camera/digital/f_index.html, 2006 Dec. 6]. Table 1 lists out the DOF of typical lenses in the third column. Note that, the computation of DOF is solely determined by the property of the lens, light wavelength and the medium light passing through. It doesn't depend upon the scene to be imaged. With increasing magnification and increasing numerical aperture, a lens has decreasing depth of field. For high magnification and numerical aperture lens, it is very short (in the order of micrometers).

The field of view of (FOV) the optical system is the part of the observable world that is seen at a snapshot. Given the lens distortion and the size of the image detector, the FOV diameters decrease with increasing lens magnifications. The diameters of 40×, 60× and 100× lenses are about 0.55, 0.37 and 0.22 millimeter, respectively. The fourth column of Table 1 tabulates some typical FOV diameters in optical microscopy.

TABLE 1

Depth of Field and Field of View

| Magnification | Numerical Aperture | DOF (micrometer) | Diameter of FOV (millimeter) |
|---|---|---|---|
| 4x | 0.10 | 15.5 | 5.5 |
| 10x | 0.25 | 8.5 | 2.2 |
| 20x | 0.40 | 5.8 | 1.1 |
| 40x | 0.65 | 1.0 | 0.55 |
| 60x | 0.85 | 0.40 | 0.37 |
| 100x | 0.95 | 0.19 | 0.22 |

The above camera model is a linear and transitionally-invariant (LTI) optical imaging system. For a two-dimensional planar scene p(x, y; u) positioned at u, given the camera parameters c≡(s, f, D), and the image on the detection plane is $$\beta(x,y;R(c,u)) = \alpha(x,y;R(c,u)) \otimes p(x,y;u) \quad (6)$$

Here $\alpha(x, y; R(c,u))$ is the PSF of the imaging system and $\beta(x, y; R(c,u))$ is the detected image on the image detection plane. The symbol $\otimes$ denotes the two-dimensional convolution.

For a three-dimensional scene, we can consider it consists of a series of thin planar objects perpendicular to the optical axis positioned at u=z, z∈□. We also assume that they are all visible individually. Now the observed image is the ensemble of all the detected planar scenes, i.e, $$\beta(x,y) = \int_{-\infty}^{\infty} [\alpha(x,y;R(c,z)) \otimes p(x,y;z)]dz \quad (7)$$

In practice, the actual depth range where the scene can be observed with acceptable blur is constrained by both α(x, y; R(c,u)) and p(x, y; u). The former case is mainly due to the limitation of DOF of the lens, the camera parameters as well as the working distance u, whereas in the later case, the constraint is due to the contrast and the brightness of the scene content. Denote this range as [u−Δu/2, u+Δu/2], then the image which can be observed focused is $$\beta(x,y;u,\Delta u) = \int_{u-\Delta u/2}^{u+\Delta u/2} [\alpha(x,y;R(c,z)) \otimes p(x,y;z)]dz \quad (8)$$

Figure 4:
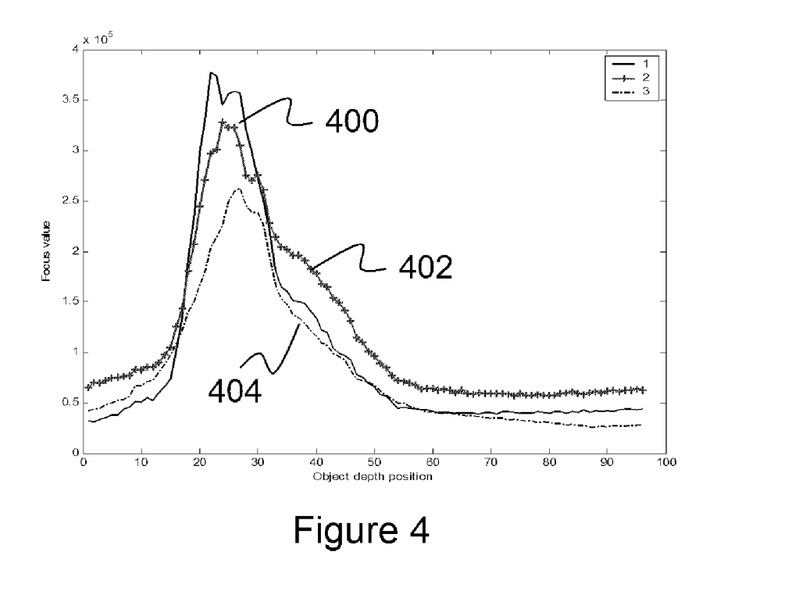
FIG. 4 shows a graph of focus value curves evaluated at three different windows.

Unlike the Rayleigh limit used to define the defocus status of a lens property, there are unique criteria to define the image focus status. Normally, a focused image is considered to have the highest contrast among its defocused counterparts thus has most high frequency components. Widely used focus measures include the frequency domain functions, gradient functions, information content functions and grey level variance [T. T. E. Yeo, S. H. Ong, Jayasooriah and R. Sinniah, "Autofocusing for tissue microscopy," Image and Vision Computing, Vol. 11, No. 10, December 1993, pp. 629-929]. Comparing their performance is beyond the scope of this specification. But essentially the larger this measure is, the higher the image contrast, and the better the image focuses. As an example, we choose the energy of image gradient function for the example embodiments, IFM:

$$IFM_k = \int_x \int_y |\nabla \beta_k(x,y)|^2 dxdy, \quad (9)$$

where $\beta_k(x,y)$, called Z-stack images, k=1, ..., K, is the k-th image captured along the optical axis, corresponding to position u in Z-axis. The integral is over the entire image area. Alternatively, a smaller window Ω of the image can be used to save computation load. The resultant measure is an approximation to that over the entire image area. In numerical implementation, such a measure can be approximated by a focus value (FV) function:

$$FV(k) = \sum_x \sum_y (G_x^2 + G_y^2), \quad (x, y) \in \Omega. \quad (10)$$

where $G_x = \beta_k(x+1, y) - \beta_k(x,y)$ and $G_y = \beta_k(x, y+1) - \beta_k(x,y)$. Suppose the size of the window Ω is $N_g \times N_g$, the complexity for this computation is $O(N_g^2)$. The focus measurement values depend on the imaging system (due to the PSF), the content of the scene, the imaging depth, the specific window of a certain size and at a certain position for FV computation. When fixing other factors, and changing imaging depth, the FV are one-dimensional functions of the object depth positions, called focus value curves. Illustrated in FIG. 4 are three focus value curves 400, 402, 404 evaluated at three different windows. They have different shape and strength. Curves 400 and 402 have multiple modes, whereas Curve 404 is unimodal.

Autofocusing is a technique which finds automatically the best focused depth among a curve of focus values FV(k), computed from a stack of images $\Delta_k$, k=1, ..., K, at different depths indexed by k. Specifically, it finds the depth index such that $$\hat{k} = \underset{k}{\operatorname{argmax}} \{FV(k)\}, \quad (x, y) \in \Omega. \quad (11)$$

Note that the computation of all FVs is within the same window Ω with certain position and size.

The autofocusing mechanism in the example embodiments is based on imaging system using software. The mechanism can be considered as an extension of Eq. (11) by reducing the window size to a pixel unit: Given a stack of images $\beta_k$, and the focus value of each pixel $FV(i_k, j_k)$, k=1, ..., K, we find the depth index $\hat{k}(i,j)$ at each pixel position (i,j) such that FV is maximized among all k∈[1,K], i.e., $$\hat{k}(i, j) = \underset{k}{\operatorname{argmax}} \{FV(i_k, j_k)\}. \quad (12)$$

The all-focused image is composed by assigning the pixel of the $\hat{k}(i,j)$-th image $\beta_{\hat{k}(i,j)}(i,j)$ at position (i,j) to the final image.

Figure 5:
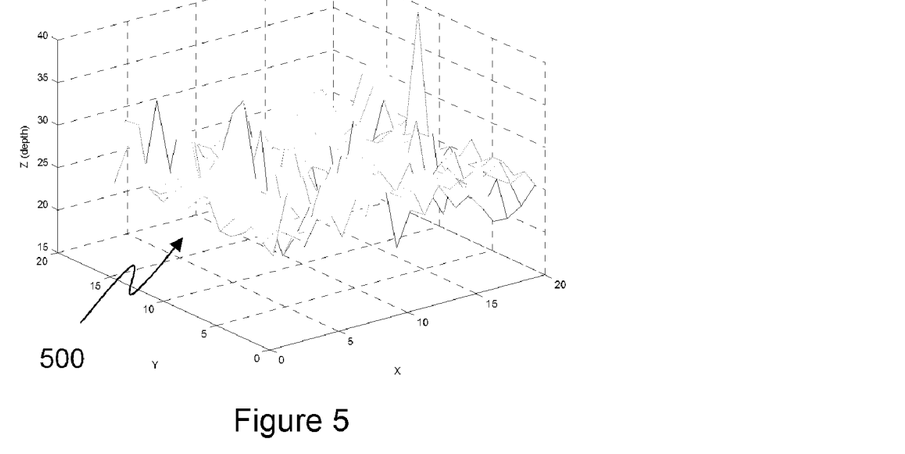
FIG. 5 is a graph showing an example of optimal depth distribution over 16×20 grids of an image.

In practice, the computation could be very time-consuming for a large image of size such as 1024-by-1280. Instead, the image is partitioned into M×N small regions (called grids). The optimal focused depth of each region is found. These depth values of the whole image is called (optimal) focus depth map (FDM). Since the map is obtained based on evaluation points (EP), it is called EP-FDM. Then each region of the focused image is found by assigning the grid of the image at that optimal depth and they are combined to produce a montage as AFI. This algorithm is called focus enhancement by grid patching [T. T. E. Yeo, S. H. Ong, Jayasooriah and R. Sinniah, "Autofocusing for tissue microscopy," Image and Vision Computing, Vol. 11, No. 10, December 1993, pp. 629-929]. In FIG. 1, each grid $g_{ij}$ is a square on which the focus value is evaluated, called an evaluation square. We extract the (i,j)-th grid of the $\hat{k}$(i,j)-th image and assign it to the center (called the evaluation point (EP)) of the same grid of the montage image. The computational cost for the entire AFI using a linear search has a complexity of $O(K \times M \times N \times N_g^2)$ for this setting. FIG. 5 shows an example of optimal depth distribution 500 (Z-axis) over the 16×20 grids (X-Y) of an image. The depths are not constant and vary from grid to grid.

The resultant image of the above method has a checkerboard appearance. To overcome this problem, interpolation is introduced using the above depths information on EPs. First, define interpolation squares using the four nearest EP as corners. At each pixel (x,y) within it, the optimal depth where the maximum focus value is found by using bi-linear interpolation. The resultant matrix with each pixel carrying the optimal depth information is called a focus-depth map based on all pixels (called Px-FDM). The final AFI is composed using the following formula:

$$AFI(x,y) = \beta_{FDM(x,y)}(x,y), \text{ for } \forall(x,y) \quad (13)$$

When using online search, the grids have to be processed one by one. Suppose we are processing two grids A and B in the same time. Based on previous results, the depth search direction for Grid A is to increase depth. However, for Grid B, it is to decrease depth. This brings a difficulty to decide which direction we should search next. Therefore these online search methods are essentially in sequential order of grids.

The number of grids, M×N, in extended focal imaging, could be quite large. Suppose the image size is 1024×1280, the non-overlapped grids have the same size of 32×32. We have M=32, N=40 and 1280 grids in total. If we process them sequentially, the number of images to be acquired and processed is huge. For example, ProScan II, a newly released motorized stage of Prior Scientific Inc, acquires 16 frames in its coarse search and then another 16 images in its fine search for autofocusing based on a single window of image [I. T. Young, R. Zagers, L. J. van Vliet, J. Mullikin, F. Boddeke, and H. Netten, "Depth-of-Focus in Microscopy," in: SCIA'93, Proc. of the 8$^{th}$ Scandinavian Conference on Image Analysis, Tromso, Norway, 1993, pp. 493-498]. If we only take K=16 images at different depths for each grid and process these grids sequentially, the number of images to be acquired is M×N×K. In this example, it is equal to 20480, much larger than K=16. Storing all of these images in the memory is impossible. However acquiring 20480 images is costly in that one has to move the lens or the scene physically to change the observed depth of the scene and each image capturing needs enough time for light exposure.

In view of this, the naïve exhaustive search seems to be more applicable here since it could capture much less images for each grid as the positions of these images can be designed beforehand. It is thus expected to be faster than the above methods. However, when applying sequential methods, the grids have to be processed one by one and eventually all of them. Therefore sequential processing of grids is not appropriate in this context.

To speed up autofocusing in EFI, we introduce a parallel processing method called PPM. The input of the algorithm is K depths node positions. For simplicity, they are assumed to be equally-spaced by interval $\Delta\Gamma$ so that the maximum search range $\Gamma=[k_{min}, k_{max}]$ is fully covered, just as the exhaustive search does. The diagram of this algorithm is summarized in FIG. 6. It consists in six steps. In the first step ST1, K images are acquired at each of the nodes. Here acquisition could mean physical capturing an image by moving the objective lens or the object stage to specified depth positions and then snapshoot the scene to allow a pulse of light exposure. It can also be simulated by reading images from memory. The time cost for either of them, $t_a$, is around a few hundreds milliseconds, in our experiments using image reading from hard disks. The total computational complexity is $O(K \times t_a)$.

Figure 6:
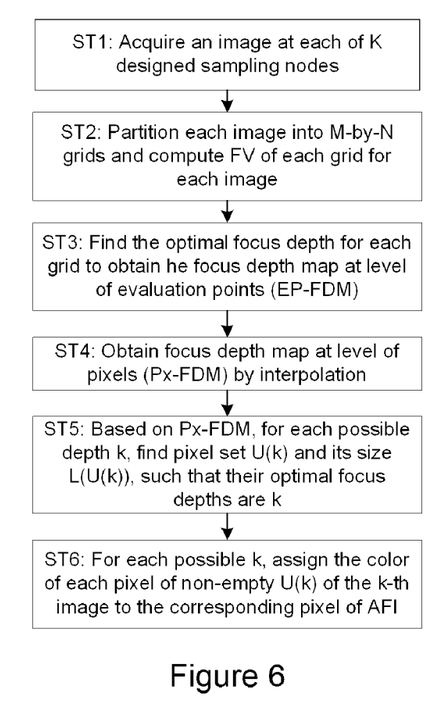
FIG. 6 is a flowchart illustrating an algorithm for parallel processing auto focusing in extended focal imaging according to an example embodiment.

In Step 2 (ST2), each image is partitioned into M×N non-overlapping grids, each of size $N_g \times N_g$. The focus values of all the M×N×K grids are computed. The computational cost is $O(K \times M \times N \times t_{fv})$, where $t_{fv}$ is the time of a single computation of FV in such a grid. $t_{fv}$ is measured in the order of milliseconds in our experiments.

In Step 3 (ST3), for each grid, the focal depth at which the maximum FV is achieved is found. These depths are assigned to the grid EP correspondingly. It yields the focus depth map, EP-FDM, based on the evaluation points. Time cost for this step is around tens milliseconds in our experiments.

In Step 4 (ST4), the focus depth of each pixel of the image is found by bilinear interpolation, producing the focus depth map Px-FDM at pixel level. The computation cost for this step is $O(M \times N \times N_g^2 \times t_{bi})$ for non-overlapping grids, where $t_{bi}$ is the computation cost for a single bi-linear interpolation, measured in the order of milliseconds in our experiments.

For each possible depth k, Step 5 (ST5) finds the pixel set U(k) from pixels of AFI based on Px-FDM, such that their optimal focus depths are k. The size of the each set L(U(k)) is also found. The computation for each k is actually the same as the computation of histogram statistical analysis in two dimensions with pixel positions returned. For each depth, its time cost is $t_{index}$, about tens milliseconds in our experiments. The total computation cost is $O(K \times t_{index})$ for the K possible depths.

For each possible k, Step 6 (ST6) assigns the color of L(U(k)) pixels of the k-th image to the corresponding pixels of AFI. The pixel positions are indexed by U(k).

The computation cost for this step is $$O\left(\sum_{k=1}^{K} t_{assign} \times L(U(k))\right),$$

where $t_{assign}$ is the time for a single color assignment. On average, the assignment for one single depth is measured in the order of hundreds of milliseconds.

To have an example, suppose K=66, image size is 1024-by-1280, partitioned into M×N non-overlapping grids, each of size $N_g \times N_g$ with M=32, N=40, $N_g$=32, the time costs for the six steps are tabulated in Table 2. Steps 1, 2 and 5 consume most of the time of the PPM algorithm. All these steps cost more time as the total number of images acquired increases. Hence one could reduce the time by decreasing this number. One way is to down sample along the depths. Assuming Case 1 and Case 2 acquire images from the same scene but the sampling rate of Case 1 is twice of that of Case 2, except for ST6, all the other 5 time cost items are reduced. The increase for ST6 is relatively small compared to the others. Below, we will refer the method used in Case 1 to Method 1 and that in Case 2 to Method 2.

The example embodiments are based on statistical learning of focal depth probability density function (PDF) of spatial neighbors of the current tile in the same scene. The results can be used to predict the start point and ending point, hence the range, of the depths at which images should be acquired. Also for those depth positions where the probabilities are high, a high sampling rate can be set to acquire more images in these areas. For those positions with low probabilities, low sampling rates will be applied. As a result, the sampling rate, on which the image acquisition nodes are based to design, is variable and adaptive to local tiles and local depths.

In one example embodiment, the first step is to learn the focal depth PDF from previously processed tiles and to update a focal depth prediction model. The focus depth prediction model consists of a structure prediction and a probabilistic prediction. Structure prediction accounts for structure factors and probabilistic prediction accounts for content characteristics of the image. Hence by using the prediction model, subsequent new tiles are able to determine the possible focal depth range and the probability of each depth to be focused in the second step. In the third step, the probability of each depth is being examined. If it is lower than a threshold Th_low, then it will be skipped without acquiring any image. If it is higher than a high threshold Th_high, then determine a small neighbour of this depth with the starting and ending depth positions and images are acquired in a high sampling rate to determine sampling nodes along the depth axis. However, if the probability is between the two thresholds, then similarly a small neighbour is determined and a low sampling rate is used to design nodes. Hence, images are acquired and being input to the parallel processing algorithm (PPM) for enhanced focal imaging.

Two versions of the example embodiment are proposed to implement large scale scene imaging. In a first version, dense nodes are only used in the beginning of the whole scanning procedure. For all those subsequent tiles, all the nodes are designed based on the prediction models dynamically updated. This is applicable to scenes having fewer tiles. However for more tiles in the procedure of imaging, it is possible that the estimated sampling nodes may drift from the optimal positions due to accumulation of errors. This situation can be handled by a second version that is using dense sampling in the midst of the procedure. The dense and equally-spaced nodes are used regularly to correct possible drift of estimation due to accumulation of errors.

In the following, we focus our discussions of automatic all-focus imaging of large three-dimensional scene on microscopy applications. In microscopy, such an application is called high throughput scanning (HTS). It is an emerging technique which uses modified microscopes and image-analysis-based software to scan the whole or a large portion of specimen slides, micro-array plates or culture chambers rapidly and automatically to large image areas [e.g. Jeffrey H. Price, "High Throughput Microscopy: From Images to Data," $3^{rd}$ IEEE International Symposium on Biomedical Imaging: Macro to Nano, ISBI 2006, pp. 247-250].

The example embodiments are based on the observation that given a scene, the detectable focused depths are limited to a certain range along the scene depth direction. The specific scene content does change the exact range of the detectable depths, the specific optimal depth of each pixel as well as the focus degree of the entire image.

Figure 7:
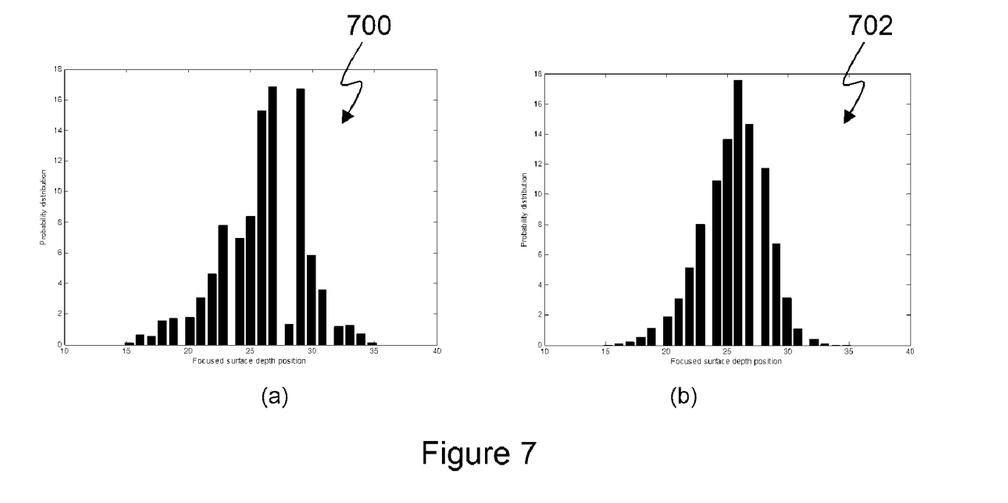

We have analyzed the probability density functions (PDF) of these focused depths based on images collected at 40 equally-spaced depths positions (i.e., nodes) of the scene. They are normalised histograms 700, 702 shown in FIG. 7, where panel (a) is computed based on the focus depth map based on evaluation points, EP-FDM, and panel (b) is from the focus depth map based on all pixels, Px-FDM. In both panels, the horizontal axis refers to the index of nodes, or focused surface depth positions and the vertical axis is the probability.

It is observed that, panel (a) exhibits multiple modes whereas panel (b) has a single mode. Also some depths have higher probabilities, while others have lower ones. Notably, some depths, such as index 0-15 and 35-40 in both (a) and (b), even do not focus at all. Among all the depths, the depths at which focused regions occur in the corresponding images spread only a range about 20 index positions from 15 to 35 in both panels (a) and (b). Skipping those index ranges with very low probability will not harm the final result greatly. Instead, it will speed up the whole imaging process.

Based on this observation, the example embodiments learn the probability density function of focused depths from historical data of processed neighboring tiles by using spatial contextual information. We assume such a probability distribution is true for both the current tile and its spatial neighbors. We apply a threshold to the probability distribution of the neighbors and do not acquire images from those depths whose probabilities are less than the threshold. Only the captured images are processed in the rest of the EFI algorithm.

When we estimate and predict the focus depth in a very large scene using an optical imaging system, besides those factors coming from the scene itself, the intrinsic system structure factors may also influence the actual result. For example, one of such factors in optical microscopy is that the stage carrying the objects may be slightly slanted or tilted. This may not be a remarkable problem for small scene imaging using a single snapshot after system calibration. If calibration is not perfect, this however has direct negative impact on the estimation of the focal depth range in large scene imaging as those small and slow changes may be accumulated gradually and finally presenting a large error.

In the example embodiments, a focus depth prediction model 2 contains two terms: a structure prediction and a probabilistic prediction.

$$z = \rho_S + \rho_R \quad (14)$$

$\rho_S$ accounts for the structure factors due to such as the tilt of stage and/or the tilt of the slide. $\rho_R$ accounts for the characteristics of tissue content, such as the layered property. Normally $\rho_S$ can be characterized by a plane equation:

$$\rho_S = a_1 x + a_2 y + a_3 \quad (15)$$

It can be estimated by using regression from a set of focus evaluation points $E_{i(x)j(y)}$, $i(x)=1, \ldots, I$, $j(y)=1, \ldots, J$, on regular grid points. Supposed the estimated parameters are $\hat{a}_1$, $\hat{a}_2$ and $\hat{a}_3$, the prediction model is formulated as $$\hat{\rho}_S = \hat{a}_1 x + \hat{a}_2 y + \hat{a}_3 \quad (16)$$

Figure 8:
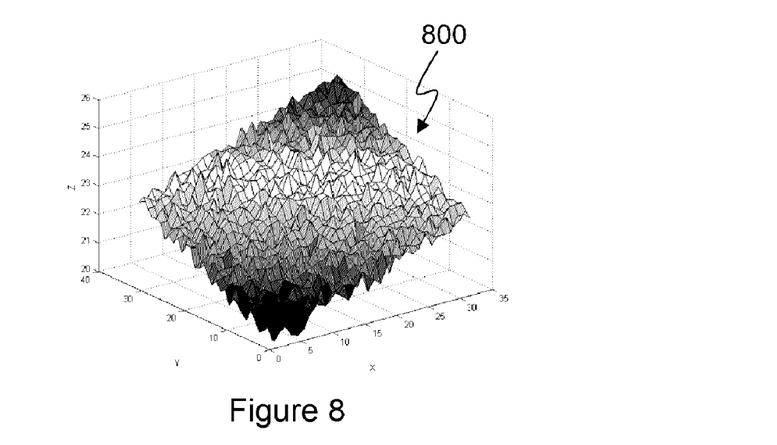
FIG. 8 shows a graph illustrating a simulation of a focus depth map of a large scene, according to an example embodiment.

The focus depth map of a single image tile based on evaluation points shown in FIG. 5 is a typical experimental result. We find the model has parameters $\hat{a}_1 = -0.0092$, $\hat{a}_2 = -0.0024$ and $\hat{a}_3 = 47.7327$. FIG. 8 is a simulation showing a focus depth map 800 of a large scene. A global trend is seen and is largely due to the tilt and/or slant of the slide. Random noise is also found.

Then we define the actual structure depth in the examined specimen $$\tau = z - \hat{\rho}_S \quad (17)$$

$\tau$ is a quantity accounting for tissue content. We consider it as a random variable with probability distribution $h(\tau)$.

The example embodiments are based on statistical learning of focal depth PDF of spatial neighbors of the current tile in the same scene. We benefit from the learned results in two ways. First, we can use them to predict the start point and ending point, hence the range, of the depths at which images are acquired. Second, for those depth positions where the probabilities are high, we can set a high sampling rate to acquire more images in these areas. For those positions with low probabilities, low sampling rates are applied. Consequently, the sampling rate, on which the image acquisition nodes are based to design, is variable and adaptive to local tiles and local depths.

Figure 9:
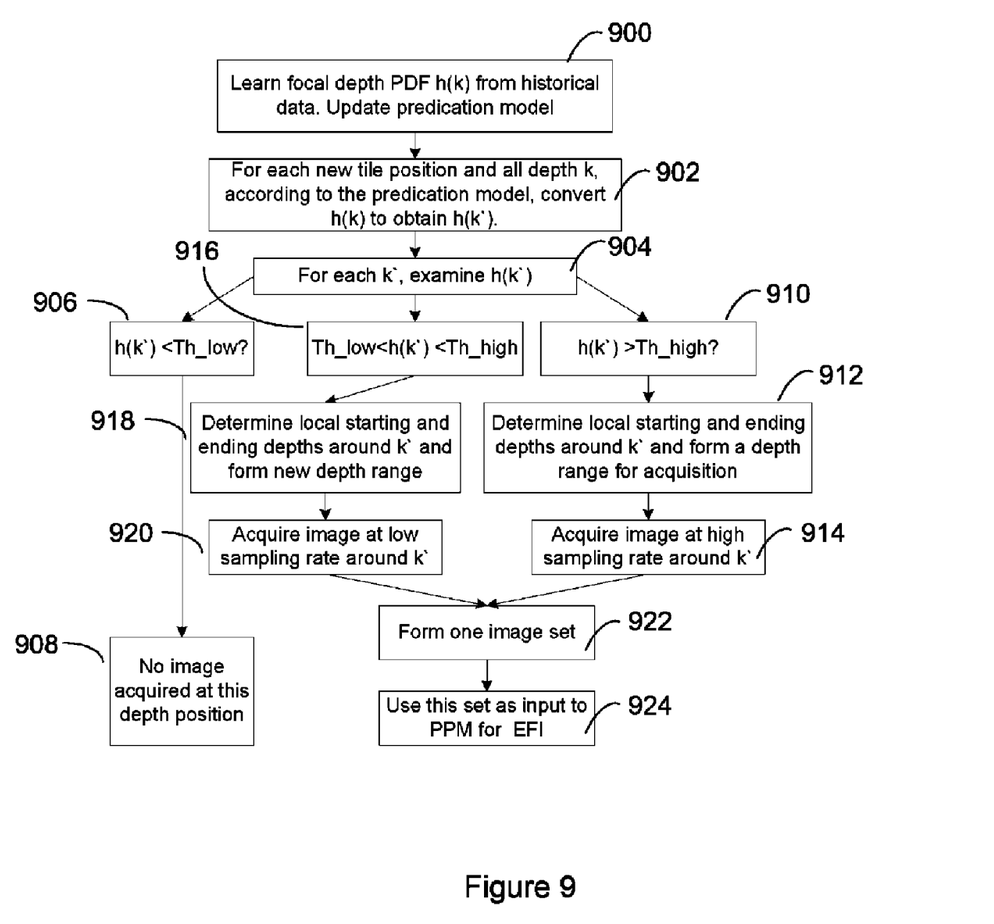
FIG. 9 shows a flowchart illustrating the process steps for a method of generating an entirely well-focused image of a three-dimensional scene, according to an example embodiment.

FIG. 9 summaries the main process steps of the example embodiments. The first step 900 is to learn the focal depth PDF from previously processed tiles. The focal depth prediction model is updated. For subsequent new tiles, using the prediction model, the possible focal depth range and the probability of each depth to be focused are found. This is done in the second step 902. Next, the probability of each depth is examined at step 904. If it is lower than a threshold Th_low (step 906), then it will be skipped without acquiring any image (step 908). If it is higher than a high threshold Th_high (step 910), then determine a small neighbor of this depth with starting and ending depth positions (step 912) and images are acquired in a high sampling rate to determine sampling nodes along the depth axis within the neighbour (step 914). However, if the probability is between the two thresholds (step 916), then similarly a small neighbor is determined (step 918) but a low sampling rate is used to design nodes (step 920). At all the designed nodes, image are acquired (step 922) and input to the parallel processing algorithm (PPM) described above for enhanced focal imaging (step 924). It will be appreciated that the thresholds used in example embodiments may differ depending on specific applications and requirements. As an example, Th_low may be in a range from about 1% to 3%, and Th_high may be in a range from about 6% to 10% (or other ranges such that the acquired images correspond to a high statistical trust region with a high confidence level such as e.g. 95%).

Figure 10:
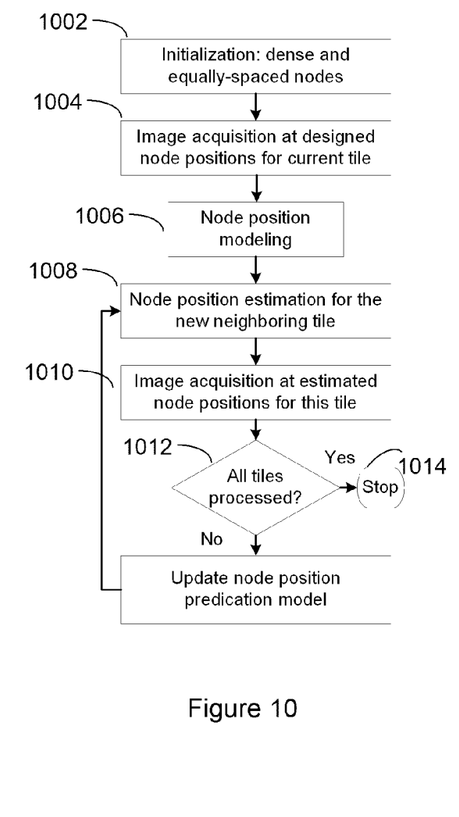
FIG. 10 shows a flowchart illustrating an algorithm of a method of generating an entirely well-focused image of a three-dimensional scene according to an example embodiment.

In the first embodiment, dense nodes are only used in the beginning of the whole scanning procedure. For all subsequent tiles, all the nodes are designed based on the prediction models dynamically updated. FIG. 10 shows a diagram of the first embodiment. At step 1002, an initialization processing is performed using dense and equally-space notes. At step 1004, image acquisition at design node positions for a current tile is performed accordingly. At step 1006, a node position model is built based on a focus map for the current tile. At step 1008, node position estimation for the new neighboring tile is performed, based on the built model from step 1006. At step 1010, image acquisition at the estimated node positions for the new neighboring tile is performed. At step 1012, it is determined whether all tiles have been processed. If yes, the process terminates at step 1014. If not all tiles have been processed, the node position prediction model is updated at step 1016 based on a focus map obtained for the latest neighboring tile, and the process loops back to step 1008 for processing of a new neighboring tile.

Figure 11:
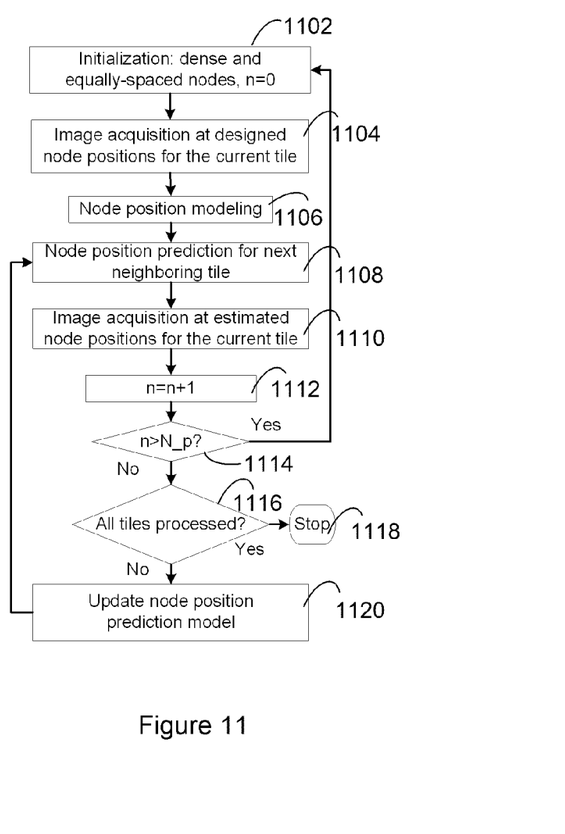
FIG. 11 shows a flowchart illustrating an algorithm of a method of generating an entirely well-focused image of a three-dimensional scene according to an example embodiment.

For more tiles in the procedure of imaging, it is possible that the estimated sampling nodes may drift from the optimal positions due to accumulation of errors. To handle this situation, in FIG. 11, we present a diagram of the second embodiment where dense sampling rate is regularly. Models are also dynamically updated. The dense and equally-spaced nodes are used regularly to correct possible drift of estimation due to accumulation of errors. In this figure, the regular period to use dense sampling is N_p. More particular, again at step 1102, an initialization processing sets a dense and equally-spaced nodes sampling, and a counter is set to zero. At step 1104, image acquisition at the design node positions for a current tile is performed. At step 1106, a model for node position is built based on a focus map. At step 1108, node position prediction for the next neighboring tile is performed. At step 1110, image acquisition at the estimated node positions for the current neighboring tile is performed. At step 1112, the counter is incremented, and at step 1114 it is determined whether or not the counter has reached the regular period to use dense sampling. If yes, the process loops back to the initialization step 1102. If note, it is further determined at step 1116, whether all tiles have been processed. If yes, the process terminates at step 1118. If not, the node position prediction model is updated based on a focus map for the current neighboring tile at step 1120, and the process loops back to step 1108. It will be appreciated that the period (N_p) used in example embodiments may differ depending on specific applications and requirements. As an example, the N_p may be in a range from about 2 to 5.

Figure 12:
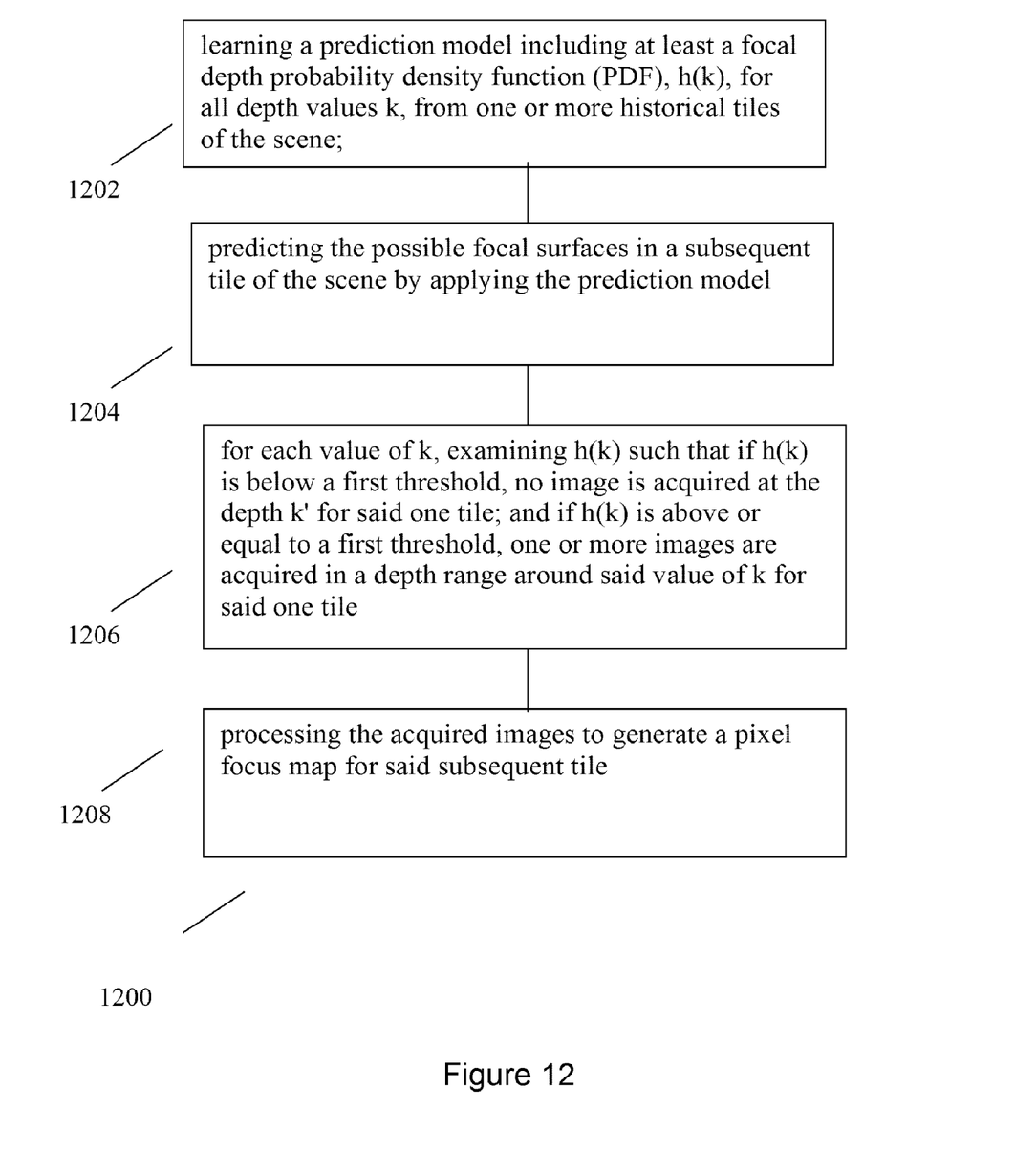
FIG. 12 shows a flow chart illustrating a method of generating an entirely well-focused image of a three-dimensional scene according to an example embodiment.

FIG. 12 shows a flow chart 1200 illustrating a method of generating an entirely well-focused image of a three-dimensional scene according to an example embodiment. At step 1202, a prediction model including at least a focal depth probability density function (PDF), h(k), is learned from one or more historical tiles of the scene. At step 1204, the possible focal surfaces in a subsequent tile of the scene are predicted by applying the prediction model. At step 1206, for each value of k, h(k) is examined such that if h(k) is below a first threshold, no image is acquired at the depth k' for said one tile; and if h(k) is above or equal to a first threshold, one or more images are acquired in a depth range around said value of k for said one tile. At step 1208, the acquired images are processed to generate a pixel focus map for said subsequent tile.

The techniques in the example embodiments are also applicable to autofocusing in unattended large continuous scene photography. In such an application, the focus depth model is learned from previous obtained image tiles and the possible focus surface for the current adjacent image tile is predicted. The probabilistic model is also applicable. Although the structure component still exists, it may be too complicated to be modelled in a general sense. The whole focus depths may thus be treated as random instances issued applications.

Furthermore, pre-learned image acquisition node positions can be prepared as options and embedded into the imaging system. Users can choose a special package from them. Alternatively, the user can also define a package of such positions such that the system will focus exactly at these nodes and the multi-focused image reflects the user's interest.

Potential applications of the current work include: unattended microscopic imaging systems, high throughput screening systems, high content screening systems, intelligent (still/video/movie) cameras, vision-guided robotic systems as well as automatic video/photography systems.

In all experiments for evaluating the performance of an example embodiment, a bright-field light microscopy (Olympus BX51) as the imaging device is used. The imaging object is a tissue slide mounted on a motorized stage (Prior Pro Scan) with two stepper motors for stage movement in the horizontal plane (X and Y) and one stepper motor for focusing (Z-axis). The microscope and the stage have been calibrated. A digital camera is connected to the eyepiece of the microscope and images are digitized into 1024-by-1280 resolution. Each image is partitioned into 32-by-40 grids of size 32-by-32 without overlap for further processing. The scene is a histology slide (H&E staining) with a thick tissue inside. By moving the stage stepwise vertically, we capture a series of Z-stack images, at nodes with interval 0.5 micrometers along the Z-axis. In our experiments, we have used 3 objectives: Olympus PlanCN 40×/0.65 (magnification ×40, NA 0.65), Olympus PlanCN 60×/0.80 (magnification Δ60, NA 0.80), and Olympus PlanCN 100×/1.25 oil (magnification ×100, NA 1.25). Both air and oil are used as immersion media with this 100× lens. Our implementation, in C program language, is compiled in a PC with 3.6 GHz CPU and 2 GB RAM.

Two prior art methods (Method 1 and Method 2) are compared with a method (Method 3) according to an example embodiment. Methods 1 and 2 capture a stack of image sections at equally-spaced depth positions along the optical axis for each tile: Method 1 uses the full Z position range and the highest sampling rate. The resultant enhanced focal images are treated as the ground truth for accuracy analysis later. Method 2 doubles the sampling interval of that of Method 1. It is a method often used for multi-scale autofocusing. In Method 3 according to an example embodiment, Th_low and Th_high are set to the same 1% and N_p is 2.

A series of experiments were conducted and the PDF of the focused depths was analyzed. It was found, that these PDFs are unimodal and their energy concentrates around the peak. For spatial neighboring grids and tiles, such PDFs are very similar. Such observations confirmed that one can utilise those PDFs from neighboring context to estimate that of the current tile, in a method according to an example embodiment.

It was found that compared to Method 1, Method 2 can save 9~20% computational time with the quality of the final AFIs reduced by 0.08~0.4%; whereas Method 3 according to an example embodiment can save 47~80% time yet with the quality degraded by 0.03~0.2%. Such degradation is considered acceptable as visually no significant difference can be perceived.

In an exemplar experiment, a histological specimen was processed using an air-immersion objective lens of 40×10.65 (magnification ×40, NA 0.65), in a computing environment with 3.6 GHz CPU and 2 GB RAM. There are 80 equal-spaced nodes for Method 1 (hence 40 for Method 2). To generate an AFI for each tile, Methods 1 and 2 use 39.74 and 31.73 seconds, respectively. The quality of AFI for Method 2 goes down by 0.14%. Method 3 according to an example embodiment uses the same time as that of Method 1 for the full range tile and only 20.96 seconds for the estimated tile. Method 3 has an overall image error of 0.19%. This demonstrates the potential of the example embodiment. It will be appreciated that the overall time saving achieved by the example embodiment will depend on the period chosen for performing the full range tile processing to reduce or minimise accumulated errors.

Figure 13:
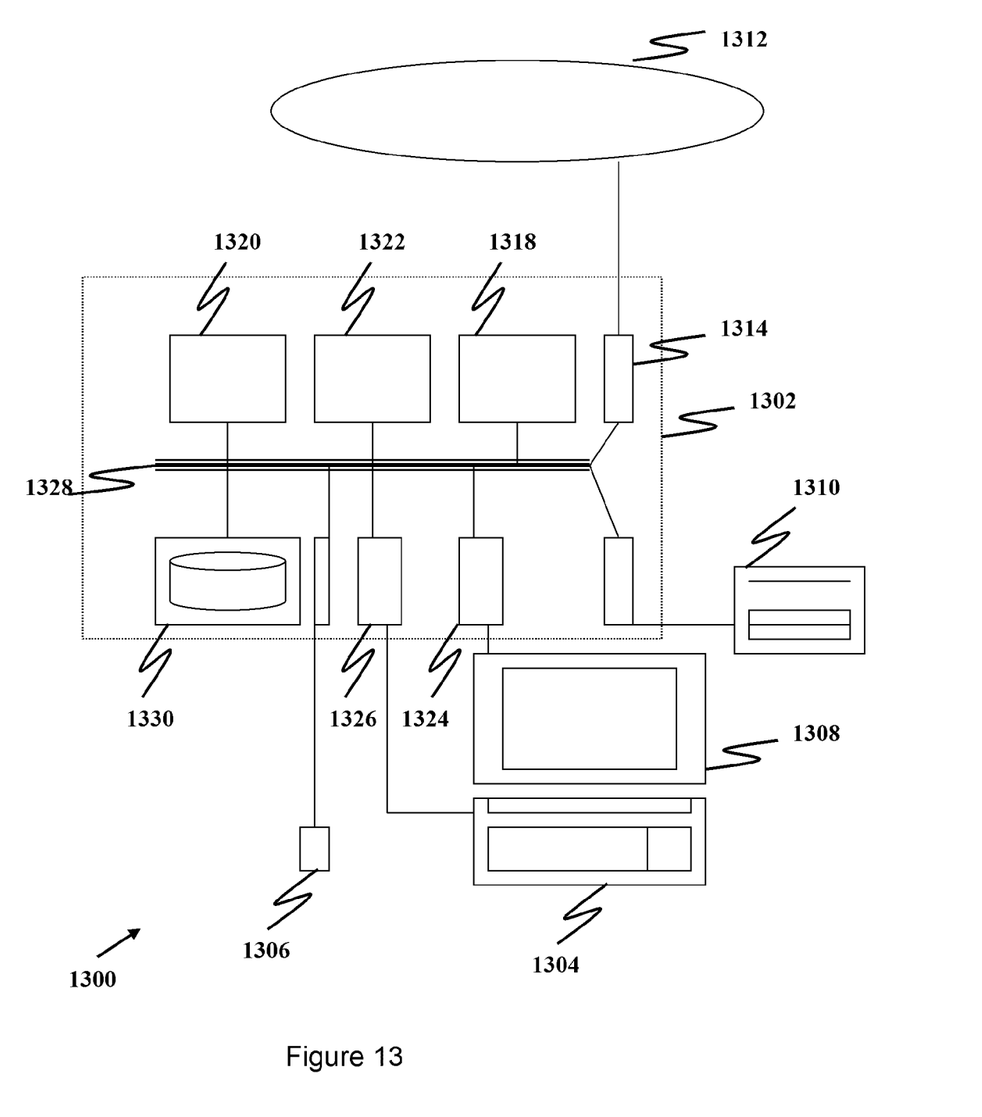
FIG. 13 shows a schematic drawing illustrating a computer system for implementing respective components of a method and system for generating an entirely well-focused image of a three-dimensional scene according to an example embodiment.

The method and system of the example embodiment can be implemented on a computer system 1300, schematically shown in FIG. 13. It may be implemented as software, such as a computer program being executed within the computer system 1300, and instructing the computer system 1300 to conduct the method of the example embodiment.

The computer system 1300 comprises a computer module 1302, input modules such as a keyboard 1304 and mouse 1306 and a plurality of output devices such as a display 1308, and printer 1310.

The computer module 1302 is connected to a computer network 1312 via a suitable transceiver device 1314, to enable access to e.g. the Internet or other network systems such as Local Area Network (LAN) or Wide Area Network (WAN).

The computer module 1302 in the example includes a processor 1318, a Random Access Memory (RAM) 1320 and a Read Only Memory (ROM) 1322. The computer module 1302 also includes a number of Input/Output (I/O) interfaces, for example I/O interface 1324 to the display 1308, and I/O interface 1326 to the keyboard 1304.

The components of the computer module 1302 typically communicate via an interconnected bus 1328 and in a manner known to the person skilled in the relevant art.

The application program is typically supplied to the user of the computer system 1300 encoded on a data storage medium such as a CD-ROM or flash memory carrier and read utilising a corresponding data storage medium drive of a data storage device 1330. The application program is read and controlled in its execution by the processor 1318. Intermediate storage of program data may be accomplished using RAM 1320.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of generating an entirely well-focused image of a three-dimensional scene, the method comprising the steps of:
    a) learning a prediction model including at least a focal depth probability density function (PDF), h(k), for all depth values k, from one or more historical tiles of the scene;
    b) predicting the possible focal surfaces in a subsequent tile of the scene by applying the prediction model;
    c) for each value of k, examining h(k) such that
        if h(k) is below a first threshold, no image is acquired at the depth k' for said one tile; and
        if h(k) is above or equal to a first threshold, one or more images are acquired in a depth range around said value of k for said one tile; and
    d) processing the acquired images to generate a pixel focus map for said subsequent tile.

2. The method as claimed in claim 1, wherein step c) comprises examining h(k) such that
    if h(k) is below the first threshold, no image is acquired at the depth k' for said one tile; and
    if h(k) is above or equal to the first threshold and below a second threshold, one or more images are acquired in the depth range around said value of k for said one tile using a first sampling rate; and
    if h(k) is above or equal to the second threshold, one or more images are acquired in the depth range around said value of k for said one tile using a second sampling rate higher than the first sampling rate.

3. The method as claimed in claim 1, further comprising updating the prediction model before steps a) to d) are applied to a next neighboring tile.

4. The method as claimed in claim 1, comprising the steps of
    i) for a first tile, acquiring images at equally spaced values of k and processing the acquired images to find a pixel focus map for said first tile;
    ii) building the PDF based on said pixel focus map for said first tile;

iii) applying steps a) to d) for n consecutive neighboring tiles; and for a (n+1)th tile, return to step i) treating the (n+1)th tile as the first tile.

5. The method as claimed in claim 1, wherein the PDF is a pre-learned model and/or a user defined model.

6. The method as claimed in claim 1, wherein the prediction model comprises a structure component and a probabilistic component.

7. The method as claimed in claim 1, wherein the acquiring of images comprises capturing images or reading stored images.

8. The method as claimed in claim 1, wherein the method is applied to microscopy or photography.

9. The method as claimed in claim 1, wherein the learning of the prediction model comprises using spatial contextual information.

10. A system for generating an entirely well-focused image of a three-dimensional scene, the system comprising:

a learning unit for learning a prediction model including at least a focal depth probability density function (PDF), h(k), for all depth values k, from one or more historical tiles of the scene;

a prediction unit for predicting the possible focal surfaces in a subsequent tile of the scene by applying the prediction model;

a processing unit for, for each value of k, examining h(k) such that if h(k) is below a first threshold, no image is acquired at the depth k' for said one tile; and if h(k) is above or equal to a first threshold, one or more images are acquired in a depth range around said value of k for said one tile; and d) processing the acquired images to generate a pixel focus map for said subsequent tile.

11. A computer readable data medium having stored thereon a computer code means for instructing a computer to execute a method of generating an entirely well-focused image of a three-dimensional scene, the method comprising the steps of:

a) learning a prediction model including at least a focal depth probability density function (PDF), h(k), for all depth values k, from one or more historical tiles of the scene;

b) predicting the possible focal surfaces in a subsequent tile of the scene by applying the prediction model;

c) for each value of k, examining h(k) such that if h(k) is below a first threshold, no image is acquired at the depth k' for said one tile; and if h(k) is above or equal to a first threshold, one or more images are acquired in a depth range around said value of k for said one tile; and d) processing the acquired images to generate a pixel focus map for said subsequent tile.

\* \* \* \* \*